Dec. 29, 1931.  H. C. EDDY  1,838,912
COMPOUND FIELD DEHYDRATOR
Filed July 2, 1927

INVENTOR:
HAROLD C. EDDY,
BY
ATTORNEY.

Patented Dec. 29, 1931

1,838,912

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

COMPOUND FIELD DEHYDRATOR

Application filed July 2, 1927. Serial No. 203,252.

My invention relates to a dehydrator adapted for coalescing the dispersed phase of an emulsion, and it has a special utility in the oil industry for separating water-in-oil emulsions.

Oil becomes associated with water and forms into an emulsion. Before oil is commercially valuable it is necessary to break down the emulsion and separate the water content from the oil. This is ordinarily accomplished by means of a dehydrator consisting of a pair of electrodes, and means for setting up an electric field between these electrodes. The emulsion is passed through the electric field which acts on it in such a manner as to coalesce the water particles into masses of sufficient size that they will precipitate by the influence of gravity.

It is an object of this invention to provide a dehydrator in which the emulsion is passed through a plurality of fields which constantly vary in field intensity.

It is sometimes practice to employ a series of stage treaters operating with independent circuits and utilizing different voltages.

It is one of the objects of this invention to utilize the multiple stage treatment of the emulsion but to employ only one electric circuit for all of the electric fields.

It is an object of the invention to provide a treater of this nature having mechanical means for varying the intensities of the electric fields.

Another object of the invention is to provide a dehydrator in which one electric field is at its maximum field intensity when the other is at its minimum field intensity.

It is a further object of the invention to provide a dehydrator in which no short-circuiting between the electrodes will take place.

Other objects and advantages of the invention will be made evident hereinafter.

Referring to the drawings in which I illustrate a preferred embodiment of the invention:

Figure 1:
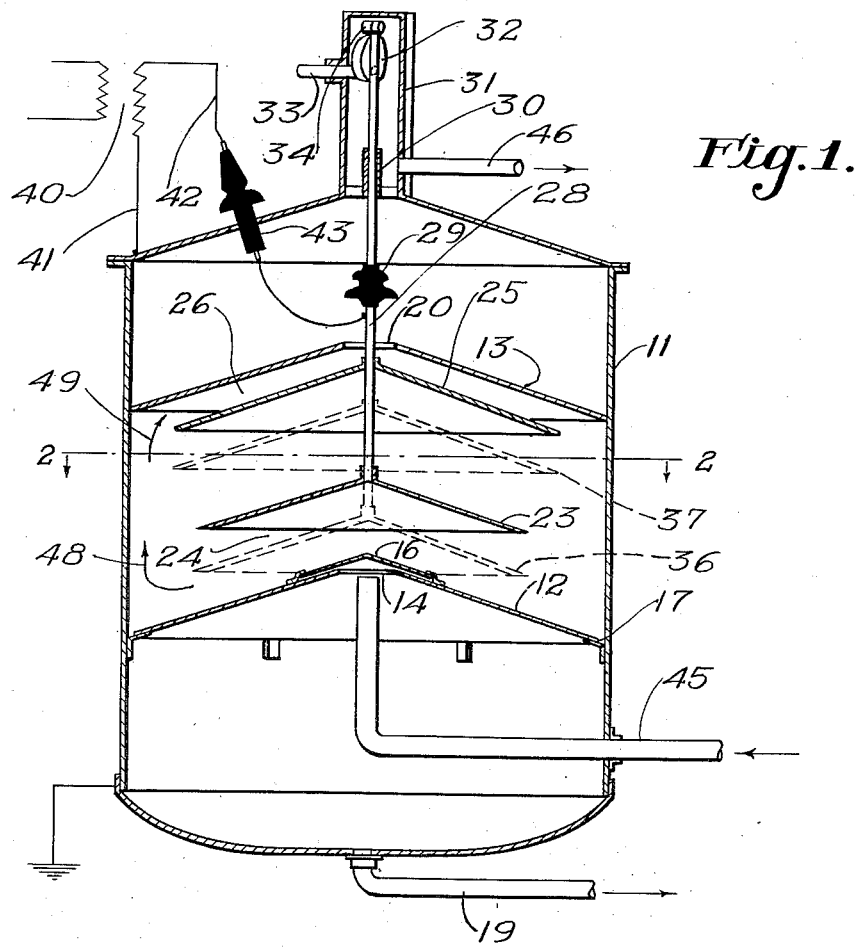
Fig. 1 is a vertical section.
Figure 2:
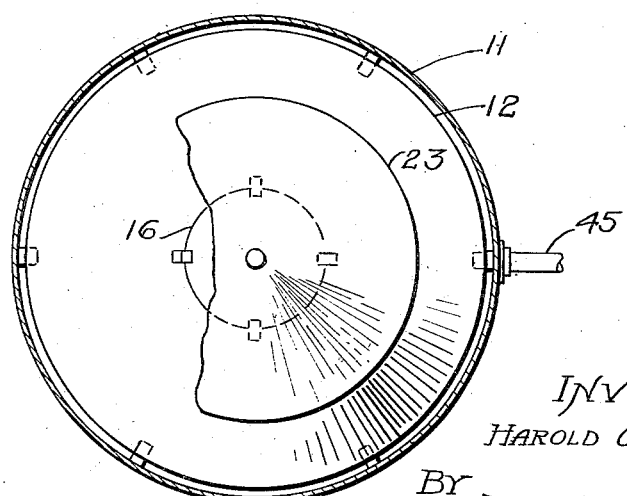
Fig. 2 is a horizontal section taken as indicated by the line 2—2 of Fig. 1.

Referring to the drawings in detail, the shell 11 of the dehydrator supports a primary grounded electrode 12 and a secondary grounded electrode 13, these electrodes defining a treating chamber. The primary grounded electrode 12 has a central opening 14 over which a deflecting plate 16 is placed. The primary grounded electrode 12 is of smaller diameter than the shell 11 so that an annular space 17 is provided between it and the shell to permit precipitates to fall to the bottom of the shell 11, these precipitates being removed through a pipe 19. The secondary grounded electrode 13 may be in tight contact with the shell 11 as shown, or a small space may be provided around it, if desired. This electrode 13 has a central opening 20. Located in the shell 11 above the primary grounded electrode 12 is a primary live electrode 23 which cooperates with the grounded electrode 12 to provide a primary treating space 24. The primary live electrode 23 is considerably smaller in diameter than the shell 11. Supported in the shell 11 below the secondary grounded electrode 13 is a secondary live electrode 25 which cooperates with the electrode 13 to provide a secondary treating space 26. This secondary live electrode 25 is also considerably smaller in diameter than the shell 11. The primary and secondary live electrodes 23 and 25 are supported by a vertical rod 28 having an insulator 29 above the electrodes which insulates the electrodes from the shell 11. The upper end of the rod 28 extends through a bearing or guide 30 which is placed at the lower end of a dome 31. Situated in the dome 31 is a crank 32 which is mounted on the inner end of a shaft 33 which extends through a bearing to the interior of the dome. The crank 32 is connected to the upper end of the rod 28 by means of a connecting rod 34. When the crank 32 is operated, the live electrodes 23 and 25 move from full line position into positions indicated by dotted lines 36 and 37.

The numeral 40 represents a source of energy in the form of a transformer. All of the electrodes are connected to the transformer 40, this being accomplished by means of a conductor 41 which is connected to the shell 11 which supports the grounded electrodes and by means of a conductor 42 which extends through an insulator 43 to the interior of the tank and is connected to the rod 28 below the insulator 29. When the transformer 40 is in operation electric fields are set up in the primary and secondary treating spaces 24 and 26. Emulsion to be treated is supplied to the interior of the shell 11 by means of an emulsion inlet pipe 45. The inner end of the emulsion inlet pipe 45 extends to a point adjacent to the opening 14 so that emulsion flowing therefrom will pass through the opening 14 and be guided by the baffle 16 along the upper surface of the primary grounded electrode 12 and into the treating chamber. Dry oil is withdrawn from the dehydrator by means of a pipe 46 which connects to the lower part of the dome 31.

The operation of the invention is as follows:

The emulsion passes from the emulsion inlet pipe 45 through the primary treating space 24 in which an electric field is set up by the transformer 40. The baffle 16, as mentioned, guides the emulsion along the surface of the primary grounded electrode 12. In this primary treating space 24 the emulsion is partly treated, and in passing from the treating space it moves upward around the outer edge of the primary live electrode 23, as indicated by the arrow 48 of Fig. 1. The emulsion passes upward and is guided by the secondary grounded electrode 13 into the secondary treating space 26, as indicated by the arrow 49. In the secondary treating space 26, where an electric field has been established by the transformer 40, the emulsion is further treated. The agglomerated water particles drop to the secondary live electrode 25 and roll down the face thereof to the edge, thereafter dropping to the primary grounded electrode 12, then passing through the space 17 around to the lower part of the shell 11. Dry oil flows from the secondary treating space 26 through the opening 20 into the upper end of the shell 11 and is withdrawn by the pipe 46.

During the treatment of the emulsion the live electrodes 23 and 25 are continuously reciprocated from full line positions into dotted line positions 36 and 37 as shown in Fig. 1. When the live electrodes are in the position shown in full lines, the distance between the primary electrodes is much greater than that between the secondary electrodes. In view of the fact that the intensity of the electric fields decrease as the distance between the electrodes is increased, it will be seen that the field intensity between the primary electrodes is at its minimum, and the field intensity between the secondary electrodes is at its maximum. When the live electrodes are in the position shown by dotted lines 36 and 37, the electric field between the primary electrodes is at its maximum field intensity, and the field between the secondary electrodes is at its minimum field intensity.

The subjecting of the emulsion to varying field intensities is efficacious in thoroughly treating the emulsion. The moving of the live electrodes prevents water particles from chaining up between the pairs of electrodes so that short-circuiting is obviated and so that it is possible to maintain the desired potential difference between the pairs of electrodes.

From the foregoing description it will be seen that this invention treats the emulsion in two stages, and both of the electric fields are connected to the same source of electrical energy. The feature of varying the field intensities of the compound dehydrator of the invention is quite important, and it is also important to have one field at its maximum field intensity when the other field is at its minimum field intensity.

I claim as my invention:

1. In a dehydrator, the combination of: a primary grounded electrode; a primary live electrode cooperating with said primary grounded electrode to provide a primary treating space; a secondary grounded electrode, a secondary live electrode cooperating with said secondary grounded electrode to provide a secondary treating space; a source of electrical energy; means for connecting all of said electrodes to said source of electrical energy to establish electric fields in said primary and secondary treating spaces; means for passing emulsion through said primary and secondary treating spaces; a rod to which said primary and secondary live electrodes are secured; and means for reciprocating said rod to vary the intensities of said fields.

2. In an electric treater, the combination of: electrodes forming a pair of treating spaces; movable means for securing certain of said electrodes together and in movable relationship with the remainder of said electrodes; means for passing the fluid to be treated through said treating spaces in succession; and means for reciprocating said movable means when said treater is in operation.

3. In an electric treater, the combination of: a shell; a primary grounded electrode supported in said shell and separated a distance therefrom; a secondary grounded electrode extending completely across said shell, there being an opening therethrough; a rod extending through said opening; a primary live electrode on said rod; a secondary live electrode on said rod, there being primary and secondary treating spaces between said primary electrodes and between said secondary electrodes; and means for passing a fluid to be treated through said fields.

4. In an electric treater, the combination of: a shell; a primary grounded electrode supported in said shell and separated a distance therefrom; a secondary grounded electrode extending across said shell, there being an opening therethrough; a rod extending through said opening and slidable relative to said shell; a primary live electrode on said rod; a secondary live electrode on said rod, there being primary and secondary treating spaces between said primary electrodes and between said secondary electrodes; means for passing a fluid to be treated through said fields; and means for reciprocating said rod.

5. A combination as defined in claim 3 in which said primary and secondary live electrodes both lie between said primary and said secondary grounded electrodes.

6. In an electric treater, the combination of: a grounded conical electrode having a central opening; a live electrode adjacent said grounded electrode, there being a treating space between said electrodes; means for introducing the fluid to be treated into said treating space through said opening; and a deflector adjacent said grounded electrode for directing said fluid adjacent said grounded electrode.

7. In a dehydrator, the combination of: a live conical electrode; a grounded conical electrode cooperating with said live conical electrode in defining a treating space; a deflector spaced from said grounded conical electrode to define an annular mouth for guiding a stream of fluid along the surface of said grounded electrode, said mouth opening on said treating space at a section spaced between the central and peripheral portions thereof; and means for delivering the fluid to be treated to said annular mouth.

In testimony whereof, I have hereunto set my hand at Los Angeles, California, this 25th day of June, 1927.

HAROLD C. EDDY.